US 6,571,086 B1

(12) United States Patent
Uusimäki

(10) Patent No.: US 6,571,086 B1
(45) Date of Patent: May 27, 2003

(54) WIRELESS COMMUNICATION DEVICE AND A CONTROL MEANS

(75) Inventor: Matti Uusimäki, Sahalahti (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/455,685

(22) Filed: Dec. 7, 1999

(30) Foreign Application Priority Data

Dec. 8, 1998 (FI) .................................................. 982647

(51) Int. Cl.⁷ ................................................ H04B 1/38
(52) U.S. Cl. ........................ 455/90; 455/550; 455/575; 379/433.06; 379/433.07; 379/368
(58) Field of Search .......................... 455/90, 550, 575, 455/566, 556; 379/433.06, 433.07, 368; 345/167

(56) References Cited

U.S. PATENT DOCUMENTS

| 5,436,954 A | 7/1995 | Nishiyama et al. ............ 379/58 |
| 6,097,964 A * | 8/2000 | Nuovo et al. ................ 455/550 |
| 6,243,080 B1 * | 6/2001 | Molne ......................... 345/173 |

FOREIGN PATENT DOCUMENTS

| DE | 42 19 887 | 11/1993 |
| DE | 44 00 668 | 7/1995 |
| DE | 196 42 812 | 4/1998 |
| EP | 0463856 | 1/1992 |
| EP | 0 526 124 | 2/1993 |
| EP | 0715441 | 6/1996 |
| EP | 0755142 | 1/1997 |
| WO | WO 97/29582 | 8/1997 |

* cited by examiner

*Primary Examiner*—William Trost
*Assistant Examiner*—Eugene Yun
(74) *Attorney, Agent, or Firm*—Perman & Green, LLP

(57) ABSTRACT

The invention relates to an electronic device, which device (1) comprises at least one housing part (2, 3); at least one control means (7) arranged in the housing part (2,3) and comprising at least one normal position (A3) from which the control means (7) is arranged to be deflected by means of first movements to control the device (1), and which control means (7) is arranged to be moved in a directional transfer (T1, T3) to at least one auxiliary position (A1, A2) from which auxiliary position (A1, A2) the control means (7) is arranged to be restored (T2, T4) to said normal position (A3); and control equipment (12–20) placed in connection with the control means (7) to control the device (1). The invention is characterized in that to control the device (1), the control means (7) is arranged to be deflected from said at least one auxiliary position (A1, A2) by means of second movements, which second movements substantially correspond to the first movements. Furthermore, the device (1) is arranged to be controlled by one or more operational sequences of the control means (7), which operational sequence is composed of at least one directional transfer (T1, T3) from the normal position (A3) to the auxiliary position (A1, A2) and at least one movement of said second movements which follow each other substantially immediately.

17 Claims, 7 Drawing Sheets

WIRELESS COMMUNICATION DEVICE AND A CONTROL MEANS

Figure 1:
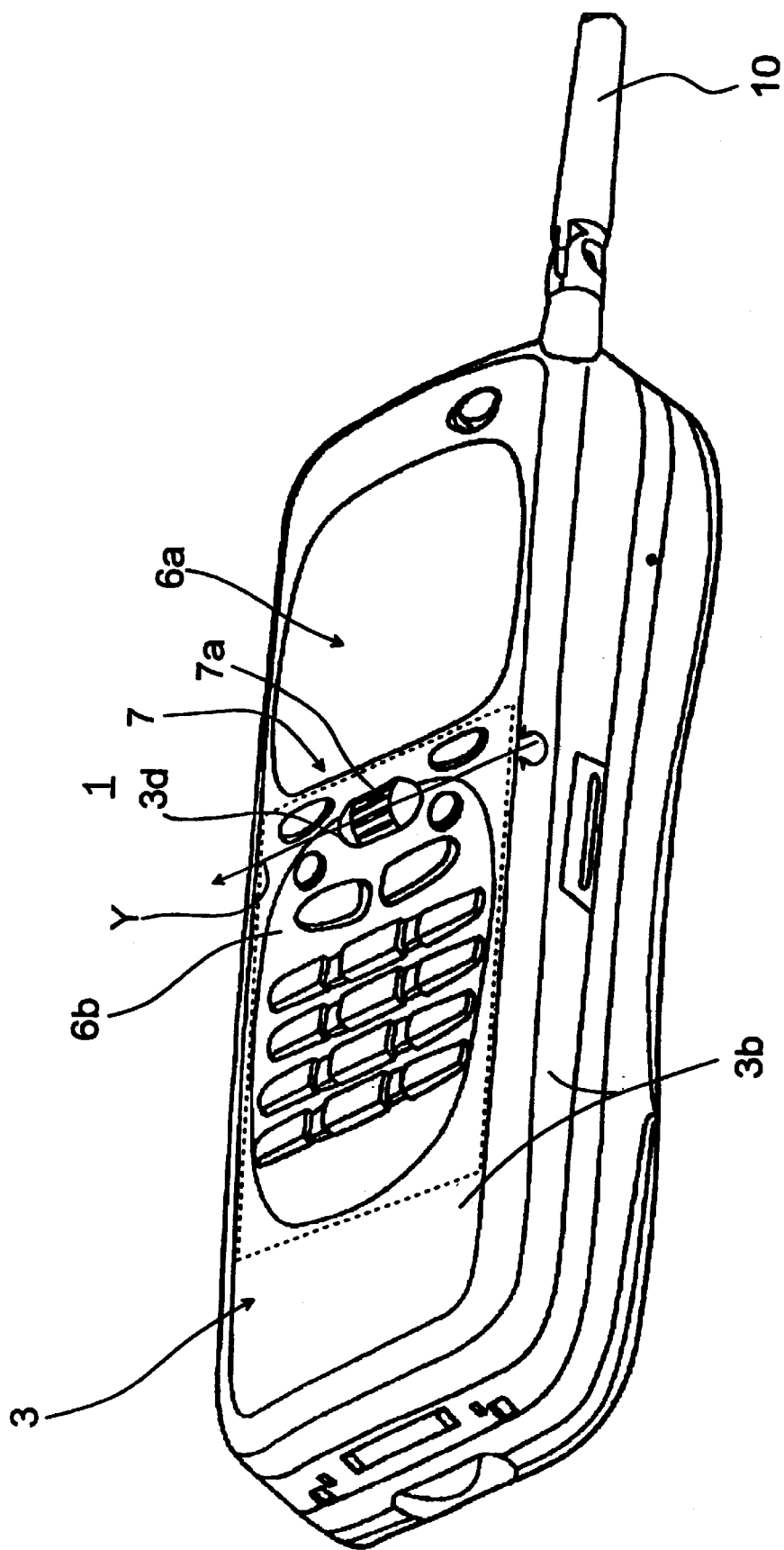

The present invention relates to an electronic device according to the preamble of claim 1. The invention also relates to a control means for an electronic device according to the preamble of claim 13. Furthermore, the invention relates to a method according to the preamble of claim 14 in the manufacture of an electronic device.

To allow better mobility for people, there are wireless communication devices available according to prior art. One wireless communication device is a mobile phone which can be for example a digital mobile phone according to the GSM standard (Global System for Mobile Communications), functioning in a mobile communication system based on a cellular network.

As is well known, there are electronic devices, such as notebook microcomputers, small hand-held computers or PDA devices (Personal Digital Assistant), available for storing various data. In this specification, PDA devices refer to devices of the above-described kind. In these devices it is possible to store for example calendar data, notes, address data, phone numbers, or corresponding data given by the user. This data can be reviewed by means of the display of the device. Data is typically entered in these devices by means of a keypad, but it is known that there are also devices available which are equipped with a touch screen.

The features of wireless communication devices, such as mobile phones, are constantly increasing, and they typically comprise functions for storing e.g. the telephone numbers of people and firms. Known devices include, for example, the Nokia 8110, 6110 and 3110 mobile phones. As is well known, there are also devices available, which comprise two user interfaces combined, for example the user interfaces of a mobile phone and a PDA device. One such device of prior art is the Nokia 9000 Communicator, whose first user interface, i.e. the PDA interface, can be used to store various data in the device, to communicate with the Internet network in a wireless manner and to receive e.g. telecopier messages, and whose second interface, i.e. the CMT interface (Cellular Mobile Telephone) can be used to operate conventional mobile phone functions, such as receiving a call and selecting a telephone number. The above-described communicator comprises separate keypads and displays for the different user interfaces, wherein the PDA user interface is arranged to be used in the opened position and the CMT user interface is arranged to be used in the closed position of the device.

In connection with wireless communication devices, various control means are known for controlling the functions of these devices. Such control means include for example one or more keys located by the display, wherein the desired control function is selected by pressing a key, the control function being indicated by displaying the command of the function in writing or a symbol representing it on the display in the vicinity of the key. The keypad typically comprises keys for moving the cursor up and down and often also to the right and to the left on the display. For this purpose, the keypad can also be provided with a rocker key i.e. a button which can be used to select the direction of movement of the cursor by pressing it into different directions.

Patent publication EP 0 463 856 B1 discloses a control means which is a control roll or trackball to be placed on the front cover of a mobile phone, for example for scanning menu functions in a menu structure. According to publication EP 0 715 441 A1, a cylindrical control roll which can be rotated around its longitudinal axis and which is used to scan the menu functions of the menu structure, can in a foldable mobile phone also be integrated in a hinge, substantially in parallel and on the same axis with the hinge. Thus, a separate control button can also be placed in the vicinity of the control roll, for the purpose of selecting and activating a menu function retrieved from the menu by means of the control roll. From publication U.S. Pat. No. 5,436,954 it is also known that a control roll placed in a hinge can be moved at least a short distance in the direction of its longitudinal axis, wherein it can be used to move the cursor shown on the display. A mobile phone can also be provided with a joystick-type control lever, guide pin, or the like, which corresponds to the functions of a trackball for controlling the cursor.

In connection with mobile phones, a known control means, disclosed in publication EP 0 755 142 A2, is a rotary discoidal control roll placed on the side of a mobile phone, which control roll can be turned to move in a telephone directory shown on the display of the mobile phone, and which control roll can be pressed to select the desired telephone number. By means of the control roll, it is also possible to form an alphanumeric character string e.g. for a telephone directory, wherein by rotating the control roll to two different directions the character to be displayed is changed, either to the previous or next one in alphabethical order, and by pressing the control roll the character to be added to the character string is selected. This takes place by means of a directional movement of the control roll towards the device, which movement activates a switch arranged in connection with the control roll. By keeping the control roll pressed down, it is possible to change the size of the character.

When the above-presented devices of prior art, especially wireless communication devices, become smaller in size, the large number and placement of control means in the device poses problems especially with respect to ergonomics and ease of use. A particular problem is that when the functions of the wireless communication devices increase and their options improve, it is also necessary to supplement the devices with various control means. When the size becomes smaller and the weight lighter, the control means also have to be reduced in size, which further impairs usability.

When the different modes and functions of wireless communication devices increase, the use of different menu structures is also increased and the menu structures become more complex. One particular aspect that causes problems in devices of prior art is the movement within the menu structure. The menu structure typically comprises menu functions which are connected together horizontally and vertically. Horizontally, it is possible to move in the menu structure by moving the cursor for example by turning a control roll. The menu function is selected by pressing a control button, which can be located for example in connection with the above-described control roll, and thereby moving to another upper level menu function. In devices of prior art, a particular problem is the movement back to a lower level. This is often arranged by means of a separate control button which comprises a cancelling function i.e. a so-called "C", "Cancel", "Clear" or "BackSpace" function. By means of this function, it is possible to return to the preceding menu level or directly to the basic level of the menu structure, from which it is possible to start advancing in the menu structure again.

The purpose of the present invention is to produce an improvement in the state of the art and to considerably enhance the usability of electronic devices. A particular objective of the invention is to diversify the possibilities of using the control means. The electronic device according to the invention is characterized in what will be presented in the characterizing part of claim 1. The control means according to the invention for an electronic device is characterized in what will be presented in the characterizing part of the claim 13. The method according to the invention in the manufacture of an electronic device is characterized in what will be presented in the characterizing part of claim 14.

The invention lends itself better than prior art to devices in which the aim is to control the functions widely by means of a one-hand grip and a small number of control means. The advantage of said one-hand grip is, for example, that the device can be controlled with one finger in a single position. A further advantage of the invention is that the need for control means is reduced, which facilitates the placement of the control means. Thus, the need for several separate control means is reduced and at the same time for example the space used by the control means is reduced when compared with prior art.

Furthermore, one advantage of the invention is that with the help of the control means it is possible to utilize a number of successive control movements that deflect the control means, for example sliding, rotating, or turning in different directions, as well as operational sequences containing simultaneous pressing and rotating, sliding or turning movements. These operational sequences are much more diversified than the prior art methods of application. Known ways of using the control means, especially a control button, include so-called clicking (pressing down and releasing) for making selections and a long-lasting pressing down for switching the power on or off. Repeated clickings of the control button are also known for changing the letter to be written when the device is used to produce texts, wherein the clickings have to be repeated within a given period of time, for otherwise the clickings are interpreted to be independent of each other, wherein the control function is different as well.

A particular advantage of the aforementioned operational sequences is that in addition to the other functions of the wireless communication device, the user can more rapidly control for example the movement within the menu structure, as well as the start-up and cancellation of the menu functions, etc. Thus, a particular advantage is also that the keypad can be eliminated altogether and the device, advantageously a mobile phone, is controlled by means of one or more control means according to the invention.

A particular advantage of the invention is that the control means can be used more widely than prior art especially for changing, scanning and selecting menu functions. By means of the invention, it is especially possible to arrange the movement to an upper level and back to a lower level in a menu structure more flexibly than in prior art. Furthermore, one particular advantage of the invention is that with the control means it is possible to control the generation and correction of alphanumeric character strings in a more diversified manner when compared to prior art.

With the invention, a special advantage is achieved for example in devices in which a wireless communication device functioning for example as a mobile phone is divided into two or more parts: into a so-called housing part; a part to be placed for example on the waist of the user and comprising an antenna, a power supply and a radio part; a part to be attached on the wrist and comprising a keypad and a display; and a receiver part. The parts are connected to each other to control the operation and to transmit information. The part to be placed on the wrist is small in size, wherein by means of the invention the number of the control buttons in the keypad can be reduced or the usability of the device can be improved. In a preferred embodiment, the keypad is replaced entirely with one or more control means according to the invention. It is obvious that the control means can also be placed on the waist or alternatively in a part to be placed in a pocket.

Furthermore, the advantage of a particular embodiment of the invention is that in addition to the normal position, the control means comprises at least two separate auxiliary positions in which it can be pressed down and simultaneously rotated. This embodiment further increases the possibilities of using the control means and the usability of the control means with the help of various operational sequences, for in the auxiliary positions, the control means can control different functions. Furthermore, a particular advantage of the control means in question is that when the control means extends through the device, the control means can be arranged to function in the same way irrespective of the direction from which it is used. It is possible to perform the pressing and turning of the control means from two different directions.

Figure 2:
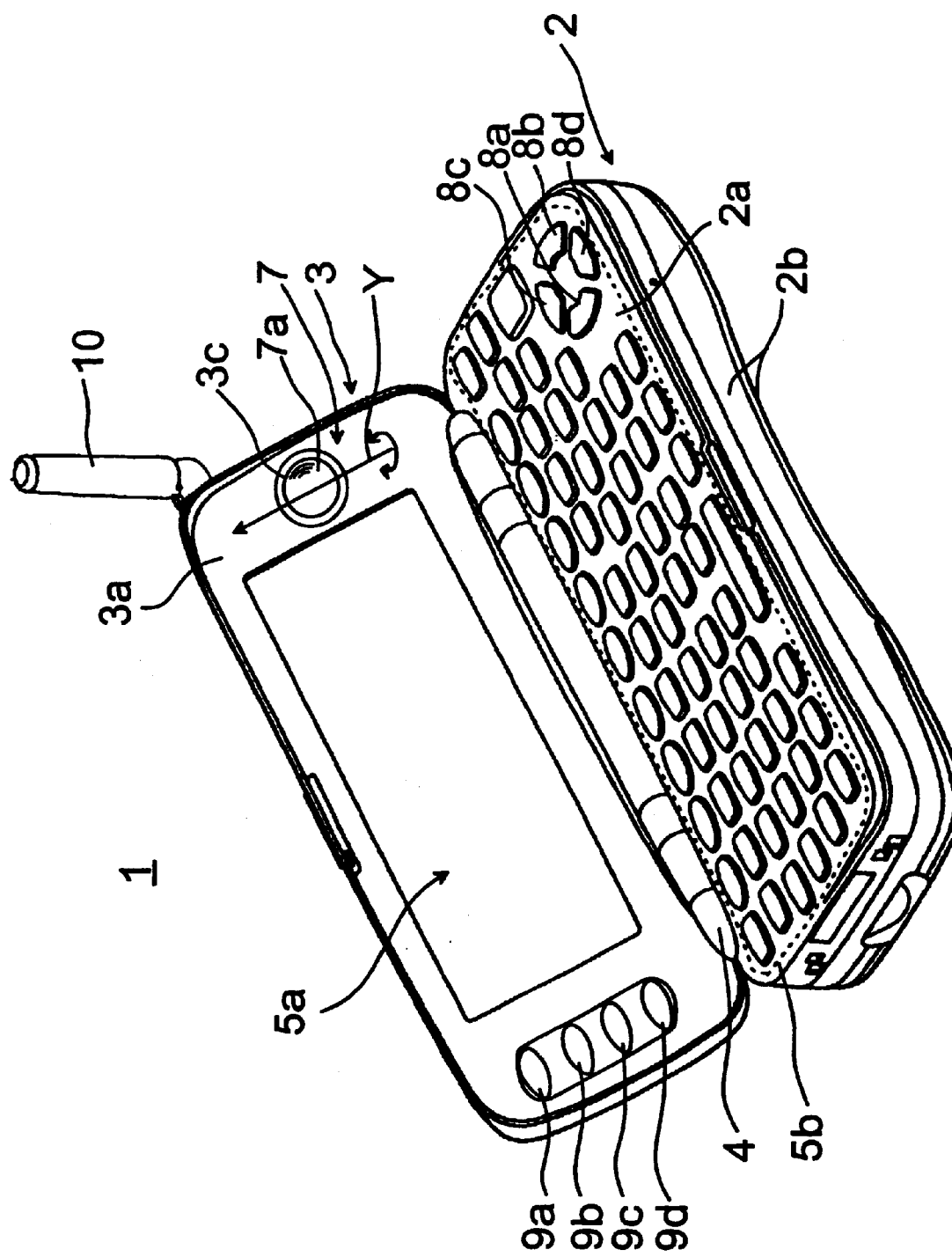
Figure 3:
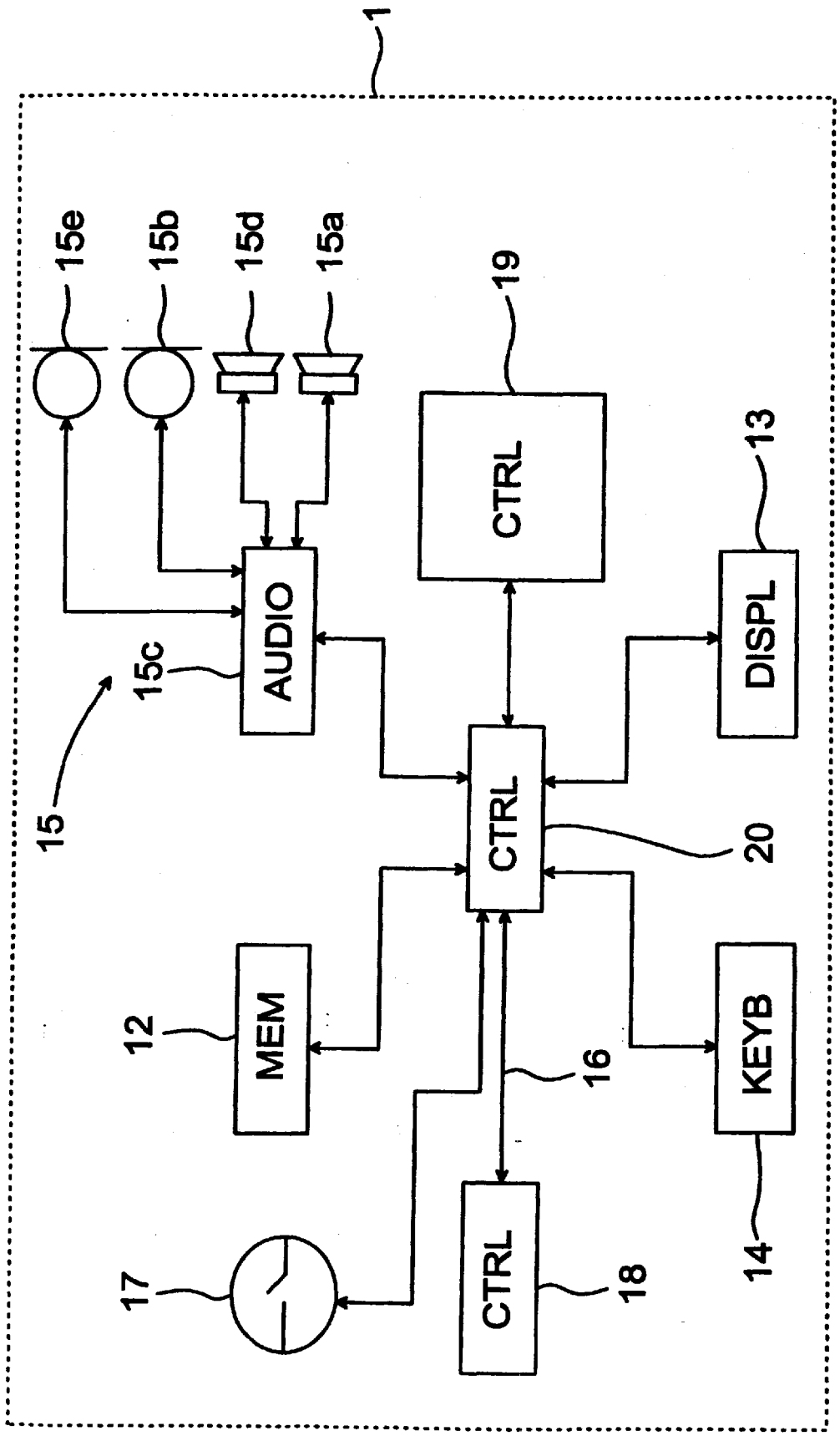
Figure 4:
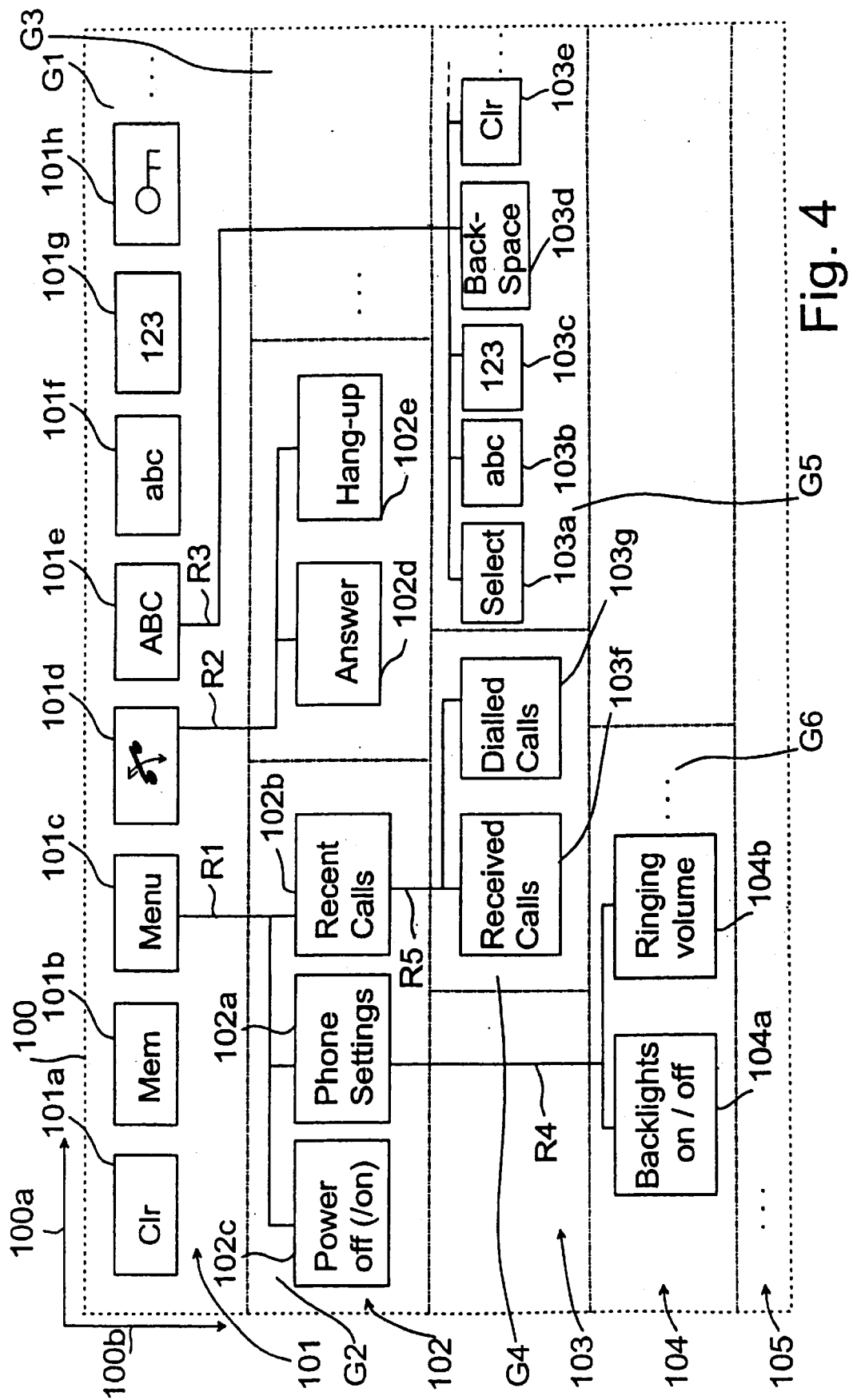
Figure 5A:
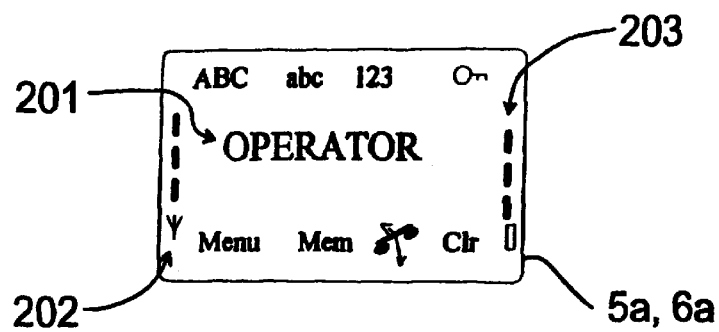
Figure 5B:
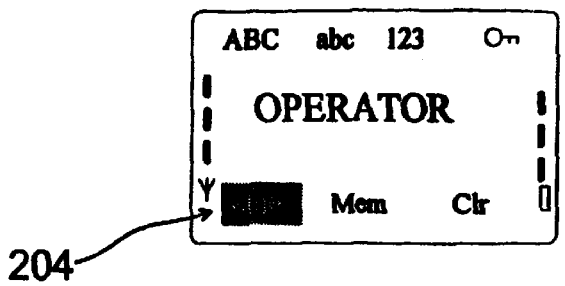
Figure 5C:
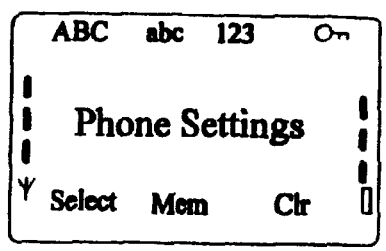
Figure 5D:
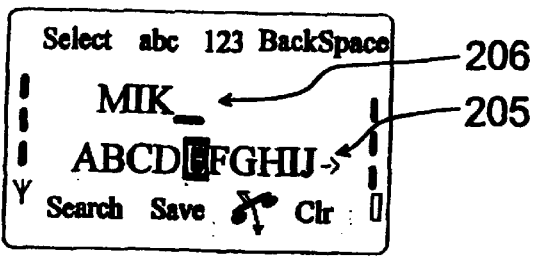
Figure 5E:
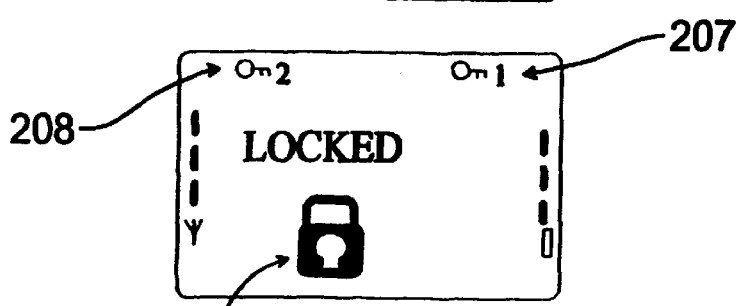
Figure 5F:
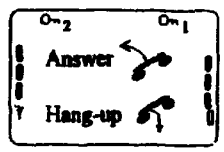
Figure 6:
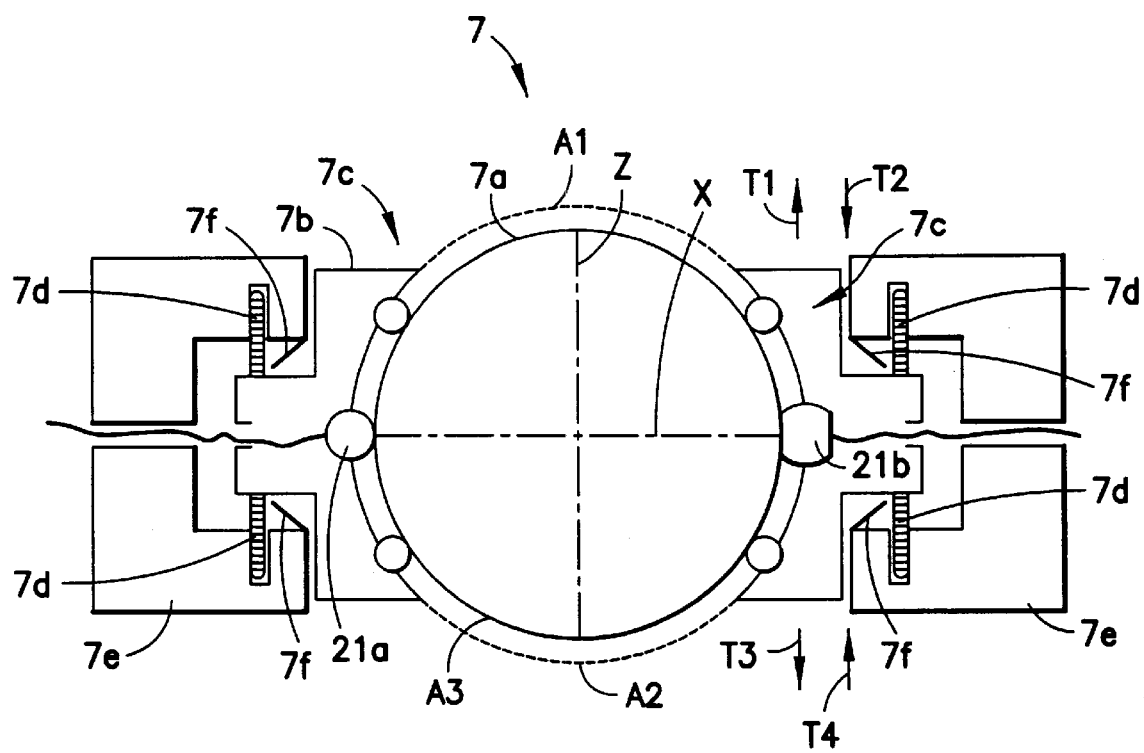
Figure 7A:
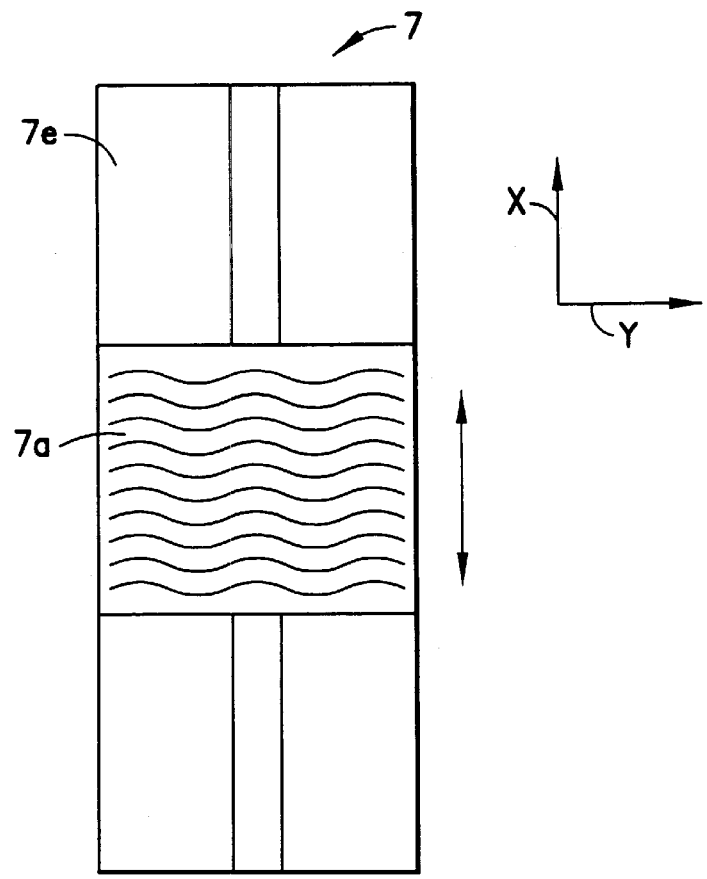
Figure 7B:
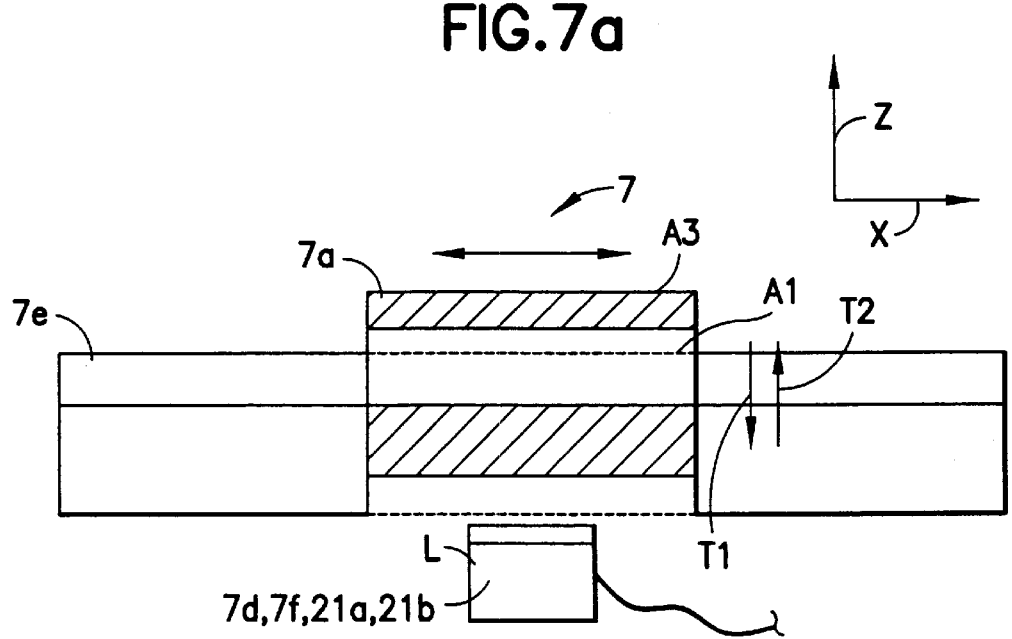

In the following, the invention will be described in more detail by using a wireless communication device according to a preferred embodiment of the invention as an example, the invention being applied in connection with the two different user interfaces of the same. It is obvious that the invention can be applied also in other devices within the scope of the claims to attain the aforementioned advantages. Especially a conventional mobile phone comprising merely a CMT interface should be mentioned in this context. In the description, reference will be made to the appended drawings in which:

FIG. 1 shows, in a perspective view, a device according to a first preferred embodiment of the invention in a closed position, FIG. 2 shows, in a perspective view, a device according to a second preferred embodiment of the invention in an opened position, FIG. 3 is a skeleton diagram showing the different functional blocks in a device according to a preferred embodiment of the invention, FIG. 4 is a block diagram showing a menu structure applied in the device and the connections between its menu functions, FIG. 5 shows the information presented on the display of the device, FIG. 6 shows, in a side-view, a cross section of the simplified structure of a control means applied in the device, FIG. 7a shows, in a top-view, the simplified structure of a second control means applied in the device, and FIG. 7b shows, in a side view, a cross-section of the simplified structure of the control means according to FIG. 7a.

With reference to FIGS. 1 and 2, the wireless communication device 1 according to the invention, i.e. the device 1, comprises a first housing part 2, which comprises at least an inner surface 2a and an outer surface 2b, and a second housing part 3 which comprises at least an inner surface 3a and an outer surface 3b. The outer surface 2b or 3b is also formed of the surfaces on the sides of the housing parts 2 or 3. The device 1 also comprises hinge means 4 for moving the first housing part 2 and the second housing part 3 into a closed position S according to FIG. 1, in which position the inner surface 2a of the first housing part 2 and the inner surface 3a of the second housing part 3 are against each other; and into a opened position A according to FIG. 2, in which position the inner surface 2a of the first housing part 2 and the inner surface 3a of the second housing part are exposed. Furthermore, the device 1 comprises first input and display means 5a–5b for the first user interface (UI), the means 5a–5b being placed on the inner surface 2a of the first housing part 2, and on the inner surface 3a of the second housing part 3; as well as second input and display means 6a–6b for the second user interface, the means 6a–6b being separate from the first input and display means 5a–5b and located on the outer surface 3b of the second housing part 3. The keypad section can also be replaced either entirely or partly with a touch screen. The user interfaces are not, however, restricted to the input and display means 5a–5b, 6a–6b of the above-described kind, but the user interface can comprise for example several display parts 5a or merely a touch screen.

Further referring to FIGS. 1 and 2, the first user interface of the wireless communication device 1 according to a preferred embodiment of the invention is a PDA user interface, and the second user interface is a CMT user interface. The first input and display means 5a–5b for the first user interface in the wireless communication device 1, comprise a keypad section 5b placed on the inner surface 2a of the first housing part 2, and a display section 5a placed on the inner surface 3a of the second housing part 3. Furthermore, the input and display means 6a–6b for the second user interface in the wireless communication device 1, comprise a keypad section 6b and a display section 6a placed on the outer surface 3b of the housing part 3. In the wireless communication device 1 shown in FIG. 2, the keypad section 5b also comprises keys 8a–8d for moving the cursor on the display of the display section 5a to the left, to the right, up and down, and the display section 5a also comprises keys 9a–9d placed next to the display section 5a for selecting control functions from the menu shown on the display of the display section 5a. Furthermore, the wireless communication device 1 also comprises an antenna 10.

Further referring to FIGS. 1 and 2, the device 1 also comprises a control means 7 which is arranged in connection with the second housing part 3. This control means 7 comprises for example a roll-like control part 7a which can be moved with a finger and which is at least partly located inside the housing part 3, the control part 7a being, according to FIG. 2, at least partly arranged in an opening 3c formed on the inner surface 3a of the second housing part 3, or according to FIG. 1, in an opening 3d formed on the outer surface 3b of the second housing part 3. In FIG. 1, the control means 7 is placed in connection with the display section 6b of the CMT user interface of the device, substantially in the middle of its top part, where it can be operated with the thumb when the device 1 is held on the palm of the hand between the thumb and the other fingers for the purpose of using the device 1. In FIG. 2, a spherical control means 7 is located in connection with the display section 5a of the PDA user interface of the device 1.

The control means 7 also comprises bearing parts (not shown in the figure) for fitting the control part 7a with bearings to the second housing part 3, in such a way that the control part 7a is arranged to move with respect to the second housing part 3, and sensor parts (not shown in the figure) for recognizing the movement of the control part 7a with respect to the second housing part 3 and for transmitting preferably an electric signal corresponding to the movement, i.e. a control signal, to the device 1. It is obvious that in the alternative of FIG. 2, the control means 7 can also be placed in the first housing part 2, for example by the keys 8a–8d. Furthermore, it is obvious that the control means can be located in the device 1 also on that side of the outer surface 2b or 3b which is substantially transverse with respect to the inner surface 2a or 3a.

According to the invention, the control means 7 is also arranged to function like a control button. Thus, for example a discoidal control part 7a is arranged to move substantially in the direction of a swing axis Z inside the control means 7, preferably in a reversible manner. Thus, the control means 7 comprises sensor parts for recognizing the movement. These sensor parts can function at least partly mechnically, photoelectrically, inductively, capacitively, or magnetically.

FIG. 6 shows a preferred embodiment of a spherical control means 7 according to a preferred embodiment of the invention in a reduced skeleton diagram. A more detailed structure of e.g. the bearing parts and sensor parts is known as such by anyone skilled in the art, and thus it is not necessary to describe their function in more detail in this context. A special feature of the control means 7 is that when it is placed in the device 1 according to FIG. 2 in such a way that it extends through both the inner surface 3a and the outer surface 3b of the housing part 3, it can be easily provided with two other auxiliary positions A1, A2 in addition to the normal position A3. In FIG. 6, the control means 7 is shown in its normal position (position A3). In the first auxiliary position (position A1) simultaneous pressing and rotating are possible, and in the second auxiliary position (position A2) simultaneous pulling and rotating are possible. In FIG. 6, a transfer T1 illustrates the transition of the control part 7a from the normal position A3 to the first auxiliary position A1, and a transfer T3 illustrates the transition of the control part 7a from the normal position A3 to the second auxiliary position A2. The transfers T2 and T4 illustrate return transfers to the normal position A3. In this context, pulling and pressing refer to the act of affecting in a different direction by means of a hold grasping the control means 7 from substantially opposite directions by the different sides of the housing part 3 of the device. It is also possible to arrange the control means 7 in the device 1 in such a way that the transition to different positions A1, A2 takes place substantially in the direction of the surface of the housing part 3 of the device 1. In the direction substantially perpendicular to the housing part 3, pulling is possible especially when the control means 7 is pin-like, wherein the control means 7 is designed for this purpose or provided with a holding friction surface.

FIG. 3 shows control means 12–20 of a wireless communication device 1 according to a preferred embodiment of the invention in a reduced block diagram. The wireless communication device 1 comprises for instance a control unit 20, memory means 12, display means 13, and input means 14. The display means 13 correspond to the earlier described display sections 5a and 6a. The input means 14 correspond to the earlier described keypad sections 5b and 6b. Furthermore, the block diagram shows audio means 15, such as a receiver 15a and a microphone 15b and an audio block 15c e.g. for converting a microphone signal from analog to digital and for converting the signal to be transmitted to the receiver 15a from digital to analog. The audio means 15 can also comprise an auxiliary receiver 15d and an auxiliary microphone 15e, e.g. for the different housing parts 2 and 3 of the device 1. The memory means 7 comprise for instance a random access memory (RAM) especially for the necessary acts of storing information during the use of the device 1, and a read-only memory (ROM) especially for storing programs.

The control unit 20 is composed of e.g. a micro controller unit (MCU), and a programmable logic circuit (ASIC, Application Specific Integrated Circuit), and it is also coupled to control blocks 19, or the like, which control other functions in the wireless communication device 1, in order to control e.g. the reception, transmission, and I/O functions (Input/Output), as well as the radio parts of the device 1. The control unit 20 also determines the position of the housing parts 2 and 3 in the device 1 by means of switching means 17 known as such, arranged in connection with the hinge means 4, and indicating whether the housings 2 and 3 are in the opened or closed position.

The control unit 20 is also coupled to the control means 7, especially its sensor means 18 from which the control unit 20 receives a control signal 16. With reference to FIG. 6, the sensor means 18 of the control means 7 according to a preferred embodiment of the invention comprise rolls 21a and 21b, which are pressed against the control part 7a and rotate under the control of the control part 7a and by means of friction. The control signal 16 comprises advantageously information e.g. on the movement of the control part 7a of the control means 7 around swing axes X (the signal given by the roll 21a) and Z (the signal given by the roll 21b). The control means 7 also comprises a floating carrier structure 7b which supports the control part 7a with bearing means 7c and which is arranged to move with respect to the frame part 7e at least in the direction of the straight line Z. Thus, according to FIG. 3, the control part 7a can be moved with a directional transfer (transfers T1–T4) in the direction of the line Z. When pressed, i.e. clicked, the control part 7a performs the transfers T1, T2, or T3, T4. The auxiliary positions are illustrated by broken lines A1 and A2, which indicate the location at which the edge of the control part 7a is placed. Thanks to spring means 7d, the control part 7a returns to its normal position A3, when it is not affected for example with a finger. It is naturally obvious that the control part 7a can be locked into at least one auxiliary position A1 or A2, from which it has to be returned separately by pressing or pulling. Microswitches 7f are coupled to the sensor means 18, and they indicate whether the control part 7a is in the position A1 or A2.

FIGS. 7a and 7b present a sliding plate-like control means 7 according to a preferred embodiment of the invention, a particular advantage of the control means 7 being its flat structure which is thus especially well suited for wireless communication devices that are small and thin. The more detailed structures and placement of the spring (part 7d), bearing and sensor parts (microswitches 7f and roll 21a or 21b) are obvious for anyone skilled in the art on the basis of the description, and thus it is not necessary to describe their function in more detail in this context. The reference numbers in FIGS. 7a and 7b primarily correspond to the parts of FIG. 6 for determining the status and position of the control part 7a, and these parts are also marked with a shared block L, which is in connection with the sensor means 18. The control means 7 is shown in its normal position (position A3), in which it is preferably centered on the line X for example by means of springs. The control part 7a is moved into its auxiliary position (position A1) by pressing, the position being illustrated by broken lines, and in which position it is also possible to slide in two directions on the line X. The control means 7 can be arranged in the device 1 also in a reversed manner so that sliding takes place on line Y. The transfer T1 illustrates the transition of the control part 7a from the normal position A3 into the auxiliary position A1. The transfer T2 illustrates the return into the normal position A3, to which the control part 7a returns preferably automatically, for example by means of a spring. The control means 7 is arranged in the device 1 preferably in such a way that the transition into the position A1 takes place in the direction Z substantially perpendicular to the housing part 3.

With reference to FIG. 6, the control part 7a of the device 1 is formed spherical. According to other preferred embodiments of the invention, the control part 7a of the control means 7 can be at least partly formed in a plate-like, discoidal, roll-like, cylindrical, or pin-like shape. With reference to FIG. 1, the control part 7a of the device 1 is formed in a roll-like shape. Furthermore, the control part 7a is arranged to rotate around the swing axis Y which is substantially parallel to the outer surface 3a. The spherical control part 7a is also arranged to rotate freely around a swing axis Z substantially perpendicular to the swing axis Y, and around a swing axis X substantially perpendicular to both of these. A discoidal or cylindrical control part 7a can be arranged to rotate around the swing axis Y or X. The discoidal or cylindrical control part 7a can also be arranged to rotate solely around the swing axis Z. A pin-like control part 7a can be arranged to rotate around only one swing axis X or Y, but advantageously the pin-like control part 7a is arranged to rotate around both of these. In this specification, rotating also refers to rotation of a joystick-type control means 7, wherein the rotation is restricted to take place between two angle positions. In the rotation, the rotational angle can even reach 360° or it is unrestricted. The rotational angle can be very small, especially in the case of a rocking control button, wherein besides pressing the control button it can also be bent to different directions in order to control the cursor.

With reference to the description above, the control means according to FIGS. 2, 6 and 7a are arranged to be deflected from their normal position A3 by means of first movements which include for example sliding, turning and rotating. Furthermore, the control means 7 is arranged to be deflected from its auxiliary position A1 (and also from the position A2) by means of second movements, which are arranged to substantially correspond to the first movements, i.e. for example sliding, turning or rotating, of each control means 7. For example the control slide 7 of FIG. 7a slides in two directions both in the normal position A3 and in the position A1 when pressed down (movement T1), and the trackball 7 according to FIG. 6 rotates into different directions both in the normal position A3 and when pressed down (movement T1) in the position A1, as well as when pulled (movement T3). The different positions and movements can be utilized in connection with the operational sequences.

FIG. 4 shows a conventional menu structure 100, known as such, which comprises several menu functions on the vertical level 100b and on the horizontal level 100a. For example menu functions 101a–101h, arranged on the same horizontal level 101, are substantially equal menu functions, which provide a route to an upper level 102, 103 of the menu structure 100, and from which the desired menu function is selected. These menu functions can appear on the display 5a or 6a simultaneously, and they are changed and scanned alternately on the display by using a control means 7, for example by rotating a trackball. If a menu appears on the display showing several menu functions simultaneously, the menu function which follows next or which can be selected for example by pressing, can be indicated in bold print, underlined, in a somehow altered manner, with its colours changed, or selected with the cursor and highlighted e.g. by flashing. By selecting a menu function, one moves to the next upper horizontal level 102–105 in the vertical direction, which level, in turn, typically comprises several menu functions which can be scanned with the control means 7. Typically, the scanning can take place within a group G1–G6, shown in FIG. 4, which groups comprise related menu functions. For example, the group G2 comprises menu functions 102a, 102b and 102c. At its smallest, the group can contain one menu function, by means of which e.g. a previously conducted selection is confirmed. In many cases, the group can also comprise several menu functions, e.g. for selecting a ringing tone for the telephone and a volume level for the receiver. When the selection is completed, the next step is often to return to the basic level 101 shown in the figure in order to search and select new menu functions.

The routes R1–R5 shown in FIG. 4, for connecting the menu functions, illustrate the different possibilities of moving from one menu function to another, wherein, according to prior art, the transition takes place typically in the vertical level by pressing the control means 7 or a control button, and in the horizontal level by rotating the control means 7. The transition from one group to another typically takes place along the above-described route via a lower level menu function. In this context, of course, it has to be noted that the different groups can comprise identical menu functions, if it is necessary for the operation of the device. Thus, the menu structure primarily represents the logical structure of the menu functions and the possibilities of advancing from one function to another.

FIG. 4 shows merely a part of the menu structure 100, which is selected to illustrate the invention. It is obvious that the menu structure 100 can also comprise other menu functions than those presented herein. Furthermore, it is obvious that the device 1 can comprise a mode from which one can move, e.g. by pressing the control means 7, to the basic level 101 of the menu structure 100 shown in FIG. 4, in order to start the menu functions. The menu structure 100 is shown as a structure extending in the horizontal 100a and vertical 100b directions, but it can also be shown as a structure which comprises different modes of the device 1, the modes being also represented by the menu functions. The transfer from one mode to another takes place under the control of keys and control means. In FIG. 4, these transfers are illustrated by means of the routes R1–R5, along which routes the transfer takes place through simple clickings and rotations. From a "Backlights on/off" mode it is thus possible to move on to a "Power off(/on)" mode via the route R4 in a manner which will be described hereinbelow, but the transfer can also be expressed with a sequence which comprises a first rotation conducted in the auxiliary position (to a "Phone Settings" mode and to a "Menu" mode), a first return to the normal position (selecting the "Menu" mode), a second rotation conducted in the auxiliary position and a second return to the normal position (selecting the "Power off (/on)" mode).

The invention can also be utilized in such a way that several functions of the device 1 are controlled with different operational sequences of the control means 7. At the same time, it is possible to indicate the effect of the operational sequences and the mode of the device 1 in the display section 5a or 6a. Operational sequences that control the device 1 include for example a sequence comprising a long-lasting press which switches the device on ("Power On" mode) or off ("Power Off" mode) respectively; when the phone rings, a sequence including a transition to the auxiliary position, a counterclockwise turn and a clockwise turn to answer the phone ("Send" mode); when the phone rings and during the call, a sequence including a transition to the auxiliary position and a clockwise turn to finish the call ("End" mode); in the normal position of the device 1, a sequence including a transition to the auxiliary position and a clockwise turn to lock the keypad; to move to the "Menu" mode according to FIG. 5a, a sequence including a transition to the auxiliary position, a counterclockwise turn and a clockwise turn; to move from the "Menu" mode to the normal mode according to FIG. 5a (and also to return in the menu structure) a sequence including a transition to the auxiliary position and a clockwise turn. A PIN code (Personal Identification Number) can be entered in the device 1 by turning the control means 7 and by selecting the numbers by pressing, but also in such a way that the PIN code is composed of a specified operational sequence. Advantageously, the aforementioned operational sequences can be specified and stored in the device 1 by the user, for example by means of a separate function.

According to the description above, the device 1 contains one or more operational sequences which are composed of at least one directional transfer (transfer T1 or T3) from the normal position A3 to the auxiliary position A1 or A2 and at least one other movement, which movements are substantially successive and by means of which the control part 7a can be deflected from the auxiliary position. An example of an operational sequence that can be mentioned is a clockwise turn followed by a counterclockwise turn. Typically, the control part 7a is automatically restored into its normal position, for example by means of a spring, when the control part 7a is not affected. The movements follow substantially immediately one after the other, and timers and set time limits in the control unit of the device 1 are used to monitor the performance.

According to a preferred embodiment of the invention, the control means 7 is used in such a way that by keeping the rotary control means 7 pressed down i.e. directionally transferred, it is possible to move up and down in the menu structure 100. In this context, the pressing refers to the act of pressing the control means 7 or moving it from its normal position A3 into an auxiliary position (position A1 or A2) with a directional transfer (transfer T1 or T3), wherein it is typically moved in the direction perpendicular to the device 1 (line Z), and to the act of releasing the control means 7 (transfer T2 or T4) from the auxiliary position substantially immediately after the pressing, wherein it is restored in its normal position in a spring-like manner. Thus, in this specification, the releasing refers particularly to the return of the control means 7 (transfer T2 or T4) into its normal position A3. By arranging the control means 7 to be automatically restored, for example by means of a spring, the use of the control means 7 is facilitated and errors due to the use are reduced.

In the following, the use of the control means 7 is examined in more detail in connection with the menu structure 100 shown in FIG. 4. FIG. 5 shows the information presented on the display 5a or 6a of the device, the information comprising typically one or more menu functions. The different situations can also illustrate different modes in the operation of the device 1, wherein the shift from one mode to another is conducted by selecting menu functions by using the control means 7 in various ways. It is obvious that at the same time, according to FIG. 5, it is also possible to present other information on the display for the user, typically the name or logo 201 of the telephone operator, the time, the intensity of the radio signal in a bar pattern 202, and the battery charge of the device in a bar pattern 203. The information can also be. presented in several different forms, e.g. in alphanumeric characters, symbols, figures, or the like.

The device 1 can be switched on by keeping the control means 7 pressed down, wherein the device 1 is moved into a mode in which it is possible to confirm that the device 1 is switched on. After this, the device 1 moves into a mode in which information according to FIG. 5a is presented on the display. The information comprises the menu functions 101a–101h of the basic level 101 according to FIG. 4, and the name or logo 201 of the telephone operator as additional information. To scan and select the menu functions 101a–101h, the control means 7 is kept pressed down, wherein the cursor 204 is activated and indicates the menu function in turn for example by highlighting it according to FIG. 5b. By keeping the control means 7 pressed down, the cursor 204 is moved from one menu function 101a–101h to another by turning or rotating the control means 7, and thus, according to FIG. 4, the cursor points at the menu functions available in the group G1 one by one.

By selecting the "Menu" function 101c by releasing the control means 7 when the cursor 204 is located at this menu function, information according to FIG. 5c is next presented on the display, the information comprising both menu functions 101a–101h of the basic level 101 and a menu function of the group G2 of the next level 102, in this case a "Phone Settings" menu function 102a. At this stage, it is possible to move on to the menu functions of the basic level 101 by pressing the control means 7 down and keeping it in that position, wherein a return to the mode according to FIG. 5b takes place, or in addition to the "Phone Settings" menu function 102a, the menu functions 101a–101h of the basic level shown on the display become available. Alternatively, it is now also possible to move backwards in the menu structure 100 by keeping the control means 7 pressed down and turning it, wherein it is possible to move for example from a "Ringing Volume" menu function 104b via the route R4 first to the "Phone Settings" menu function 102b and further along the route R1 to the basic level 101. Furthermore, by means of a rotation effected in the auxiliary position, it would be possible to move forward in the menu structure 100, back to the "Ringing Volume" menu function 104b along the used route R1–14, which route is also stored in the memory of the device. Thus, it is also easy to move backward and forward along the used route by means of one control means 7 and a one-hand grip. Transfer to an upper level and back can naturally be arranged only as far as to the menu function to which one has advanced along the routes by making selections.

If, however, one desires to move to another menu function in one route, in the above-described situation access to the "Backlights on/off" menu function 104a can be gained by moving to the "Phone Settings" menu function 102a by means of a rotation conducted in the auxiliary position, and by releasing the control means 7. After this, it is possible to scan the "Ringing Volume" menu function (104b) and "Backlights on/off" menu functions (104a) by means of a rotation and to select the "Backlights on/off" menu function 104a by pressing the control means 7. After this, the alternatives "ON" and "OFF" (not shown in the figure) can be presented on the display, of which alternatives the next in turn is indicated for example with a flashing cursor.

The period of time used for keeping the control element 7 pressed down can also be utilized to separate the different functions of the device 1 from each other, wherein for example in the act of pressing down, the device 1 first waits for rotation for a while, and first after a set time it moves automatically straight to the basic level 101. Thus, the user can communicate the desired function to the device 1 with the duration of the pressing or with the duration of the pressing preceding a rotation. Thus, the control unit 20 of the device 1 monitors, for example with timers, the delays in the procedures and in the operational sequences of the control means. By means of a signal 16 received from the sensor means 18, a controller program which operates under the control unit 20, controls the display section 6a or 5a to present information. Information on the modes of the device 1, on the menu structure 100 and on the different menu functions are stored in the device 1, and by means of the control signals received from the keypad section 6b and 5b and the control means 7, the control program selects the information to be presented, and controls the other functions of the device as well.

The "Phone Settings" menu function 102a can now be selected by pressing and immediately relasing, i.e. clicking, the control means 7, after which the display presents at least one menu function 104a or 104b of an upper level 104, and the menu functions of the same group G6 can be scanned on the display by turning the control means 7. It is obvious that several menu functions can be presented on the display in a list, wherein the cursor is used to point the menu function next in turn. This is shown in FIG. 5f, in which by selecting the telephone symbol, shown in FIG. 4, i.e. the menu function 101d, two menu functions 102d and 102e have become available.

If, however, the user wants to switch the device 1 off, the transfer to the menu function in question can be performed in the following way. By keeping the control means 7 pressed down, it is possible to first move to the "Backlights on/off" menu function 104a by means of a rotation. At the same time, the return indicates to the control unit 20 of the device 1 that the function is cancelled. In a roll-like control means, the rotation can be effected clockwise or counterclockwise, and in a spherical control means also to the right, to the left, up, down or as a combination of these, and in a pin-like control means as a turn to the corresponding directions. Still controlled by a continuous pressing and rotation, the next step is to move to the menu function 102a according to FIG. 5c. By releasing the control means 7, this horizontal level 102 is selected, which level also includes the "Phone Settings" menu function 102a. The menu functions 102a–102c of this level 102 can now be scanned by means of rotation, and the desired "Power Off/(On)" menu function 102c can be selected by clicking. The device 1 may require a confirmation for the switching-off, which confirmation can also be conducted by clicking.

The following is a more detailed description on the use of the control means 7 in the mode of the device 1 in which a character string composed of alphanumeric characters is formed. In a situation according to FIG. 5b, the cursor 204, controlled by a rotation conducted in the auxiliary position, is moved onto an "ABC" menu function 101e and the selection is made by releasing the control means 7. The "ABC" menu function 101e initiates an input mode in which characters, in this case capital letters, are written. Thus, the display 5a, 6a presents information according to FIG. 5d, the information comprising both a list 205 in which the available characters can be scanned, the movements in the list being conducted by means of the cursor; and a character string 206 that is being formed, as well as the menu functions of the group G5, one of which is an "abc" menu function 103b for writing small letters. A character is selected from the list 205 by moving the cursor by rotating the control means 7, and the character with which the character string 206 is desired to be supplemented, is selected by clicking. Controlled by the rotation conducted in the auxiliary position, it is possible to move on to scan the other menu functions of the group G5 presented on the display, for example the "abc" menu function 103b for writing small letters, a "123" menu function 103c for writing numerals and a "BackSpace" menu function 103d for deleting the last written character from the character string 206. Thus, the "BackSpace" menu function 103d is selected by relasing the control means 7, and after deleting the character, the cursor is automatically moved to the character string 206 and into the input mode. By means of a "Clr" menu function 103e it is possible to return to the basic level 101, into the basic mode according to FIG. 5a.

Alternatively, by turning the control means in the auxiliary position it is also possible to move the cursor to the character string 206 to be formed in order to scan the same. By the desired character in the character string 206, the control means 7 is released, and thus a location is indicated which is to be replaced or supplemented with a character to be input next from the list 205. If the character string 206 comprises a telephone number or a name which refers to a telephone directory, it is possible to initiate a call in the auxiliary position by selecting the menu function 101d indicated by the telephone symbol. The character string 206 can be stored in the telephone directory by means of a "Save" menu function shown in FIG. 5d. The name according to the character string can be retrieved from the telephone directory stored in the device 1 by means of a "Search" menu function 103a.

In the following, the locking functions of the device 1 will be discussed. When the device 1 is locked, the display can present information according to FIG. 5e, wherein it is not possible to use the keypad 5b or 6b, and only selected functions of the device 1 can be used. The device can be locked by selecting a key symbol, i.e. the menu function 101h for example in a situation according to FIG. 5b. The lock is opened for example in such a way that by turning the control means 7, the cursor is moved onto a first key symbol 207 and by pressing the control means 7 down, the key 207 is selected and by turning the control means further the key is moved on a lock symbol 209. The same process can be repeated for the second key symbol 208, if two keys are used for unlocking. After unlocking, the next step is to move e.g. into the mode according to FIG. 5a.

When the locking is on, an incoming call can automatically initiate the mode according to FIG. 5f, in which mode it is possible to select an "Answer" menu function 102d for answering the call, and a "Hang-up" menu function 102e. The shift into this mode can also take place after the "Search" menu function in order to set up an outgoing call. During the call, the volume of the speaker 15d or 15a of the device 1 can be adjusted by rotating the control means 7, and the call can be terminated by clicking. By means of pressing and rotation, in other words by means of a rotation conducted in the auxiliary position, it is possible to move into the mode according to FIG. 5f in order to select the "Hang-up" menu function 102e. After this, the device can return to a basic mode according to FIG. 5a on the basic level 101. In the discussion above, rotation has been used as an example, but it is obvious that in case of a control means 7 according to FIG. 7a, the rotation is paralleled by sliding the control part 7a in different directions, wherein by keeping the control part 7a in a slided i.e. deflected position, e.g. menu options are continuously scanned or a transfer is made only to the next menu option.

In the specification acove, the invention was described as applied to a preferred wireless communication device, but on the basis of the description it is obvious for anyone skilled in the art that the invention can be applied also in connection with other electronic devices within the scope of the claims.

What is claimed is:

1. A wireless communication device, which device comprises:
   at least one housing part,
   at least one control means arranged in the housing part and comprising at least one normal position from which the control means is arranged to be deflected by means of first movements of said control means to control the device, and which control means is arranged to be moved in a directional transfer to at least one auxiliary position from which auxiliary position the control means is arranged to be restored to said normal position,
   control equipment, placed in connection with the control means to control the device,
   wherein to control the device the control means is arranged to be deflected from said at least one auxiliary position by means of second movements of said control means, which substantially correspond to the first movements, and
   one or more single functions of the device are arranged to be selected by one or more operational sequences each composed of movements following each other substantially immediately, which operational sequence is composed of a group of said first movements, or of a group of said second movements, or of a combination of at least one said first movement and at least one said second movement, or of a combination of at least one said first movement and at least one said directional transfer, or of a combination of at least one said second movement and at least one said directional transfer.

2. The device (1) according to claim 1, characterized in that the device (1) is arranged to be controlled by one or more operational sequences of the control means (7), which operational sequence is composed of at least one directional transfer (T1, T3) from the normal position (A3) to the auxiliary position (A1, A2) and at least one movement of said second movements, which follow each other substantially immediately.

3. The device (1) according to claim 1, which device (1) comprises at least one display section (5a, 6a) arranged in the housing part (2, 3) for displaying information, characterized in that the control means (7) is also arranged to control the information presented in the display section (5a, 6a).

4. The device (1) according to claim 3, wherein the information comprises at least one menu function (101a–101h, 102a–102e, 103a–103g, 104a–104b), characterized in that the menu functions (101a–101h, 102a–102e, 103a–103g, 104a–104b) are arranged to be scanned by means of deflecting the control means (7) in the auxiliary position.

5. The device (1) according to claim 3, wherein the information comprises at least one menu function (101a–101h, 102a–102e, 103a–103g, 104a–104b), and wherein at least some of the menu functions (101a–101h, 102a–102e, 103a–103g, 104a–104b) are arranged to be selected under the control of the transfer (T1, T3) of said control means (7) from the normal position (A3) to the auxiliary position (A1, A2), characterized in that at least some of the menu functions (101a–101h, 102a–102e, 103a–103g, 104a–104b) are arranged to be selected under the control of the transfer (T2, T4) of said control means (7) from the auxiliary position (A1, A2) to the normal position (A3).

6. The device (1) according to claim 3, wherein the information comprises at least one menu function (101a–101h, 102a–102e, 103a–103g, 104a–104b), and wherein the transfer from the first menu function (101a–101h, 102a–102e, 103a–103g, 104a–104b) to the second menu function (101a–101h, 102a–102e, 103a–103g, 104a–104b) is arranged to be controlled by the transfer (T1, T3) of said control means (7) from the normal position (A3) to the auxiliary position (A1, A2), characterized in that the return from the second menu function (101a–101h, 102a–102e, 103a–103g, 104a–104b) to the first menu function (101a–101h, 102a–102e, 103a–103g, 104a–104b) is arranged to be controlled by the deflection occurring in the auxiliary position (A1, A2) of the control means (7).

7. The device (1) according to claim 3, wherein the information comprises at least one menu function (101a–101h, 102a–102e, 103a–103g, 104a–104b), and wherein the menu function (101a–101h, 102a–102e, 103a–103g, 104a–104b) comprises at least one character string (206) which comprises at least one alphanumeric character (205), characterized in that the character string (206) is arranged to be scanned by means of deflecting the control means (7) in the auxiliary position (A1, A2).

8. The device (1) according to claim 1, characterized in that in the normal position (A3) and in the auxiliary position (A1, A2), the control means (7) is arranged to rotate around a direction (X, Y) substantially parallel to the housing part (2, 3).

9. The device (1) according to claim 1, characterized in that in the normal position (A3) and in the auxiliary position (A1, A2), the control means (7) is arranged to slide in a direction (X, Y) substantially parallel to the housing part (2, 3).

10. The device (1) according to claim 1, characterized in that the control means (7) is arranged to move from its normal position (A3) to the auxiliary position (A1, A2) and vice versa in a direction (Z) substantially perpendicular to the housing part (2, 3).

11. The device (1) according to claim 1, characterized in that the control means (7) is at least partly formed to be button-like, plate-like, spherical, cylindrical, discoidal, roll-like, or pin-like.

12. The device (1) according to claim 1, characterized in that the control means (7) is provided with at least two auxiliary positions (A1, A2), that the auxiliary positions (A1, A2) are arranged on opposite sides of the normal position (A3), and that the control means (7) is arranged to extend through the housing part (2, 3).

13. A control means for an electronic device, which device comprises at least one housing part for applying a control means and control equipment for controlling the device, and which control means comprises at least one normal position from which the control means is arranged to be deflected by means of first movements in order to control the device, and which control means is arranged to be moved in a directional transfer to at least one auxiliary position, from which auxiliary position the control means is arranged to be restored to the normal position, wherein to control the device, the control means is also arranged to be deflected from said at least one auxiliary position by means of second movements, which substantially correspond to the first movements and the control means is provided with at least two auxiliary positions, that the auxiliary positions are arranged on opposite sides of the normal position, and that the control means is arranged to extend through the housing part.

14. A method in the manufacture of an electronic device, in which method an electronic device comprising at least one housing part is arranged to be controlled by at least one control means arranged in said housing part, which control means comprises at least one normal position from which the control means is arranged to be deflected by means of first movements of said control means in order to control the device, and which control means is arranged to be moved in a directional transfer to at least one auxiliary position, from which auxiliary position the control means is arranged to be restored to the normal position, and which electronic device further comprises control equipment connected to said control means to control said electronic device, wherein the electronic device is also arranged to be controlled by means of second movements of said control means, with which movements the control means is arranged to be deflected from said at least one auxiliary position, and which movements substantially correspond to the first movements and one or more single functions of the device are arranged to be selected by one or more operational sequences each composed of movements following each other substantially immediately, which operational sequence is composed of a group of said first movements, or of a group of said second movements, or a combination of at least one said first movement and at least one said second movement, or of a combination of at least one said first movement and at least one said directional transfer, or of a combination of at least one said second movement and at least one said directional transfer.

15. The method according to claim 14, characterized in that the electronic device (1) is arranged to be controlled by one or more operational sequences of the control means (7), which operational sequence is composed of at least one directional transfer (T1, T3) from the normal position (A3) to the auxiliary position (A1, A2) and at least one movement of said second movements, which follow each other substantially immediately.

16. An electronic device, which device comprises:
at least one housing part,
at least one control means arranged in the housing part and comprising at least one normal position from which the control means is arranged to be deflected by means of first movements of said control means to control the device, and which control means is arranged to be moved in a directional transfer to at least one auxiliary position from which auxiliary position the control means is arranged to be restored to said normal position,
control equipment, placed in connection with the control means, to control the device,
wherein to control the device the control means is arrange to be deflected from said at least one auxiliary position by means of second movements of said control means, which substantially correspond to the first movements,
said device further comprising at least one display section arranged in the housing part for displaying information, wherein the control means is also arranged to control the information presented in the display section, wherein the information comprises at least one menu function, wherein at least some of the menu functions are arranged to be selected under the control of the transfer of said control means from the normal position to the auxiliary position, and wherein at least some of the menu functions are arranged to be selected under the control of the transfer of said control means from the auxiliary position to the normal position.

17. An electronic device, which device comprises:
at least one housing part,
at least one control means arranged in the housing part and comprising at least one normal position from which the control means is arranged to be deflected by means of first movements of said control means to control the device, and which control means is arranged to be moved in a directional transfer to at least one auxiliary position from which auxiliary position the control means is arranged to be restored to said normal position, control equipment, placed in connection with the control means, to control the device, wherein to control the device the control means is arranged to be deflected from said at least one auxiliary position by means of second movements of said control means, which substantially correspond to the first movements, said device further comprising at least one display section arranged in the housing part for displaying information, wherein the control means is also arranged to control the information presented in the display section, wherein the information comprises at least one menu function, and wherein the transfer from the first menu function to the second menu function is arranged to be controlled by the transfer of said control means from the normal position to the auxiliary position, and wherein the return from the second menu function to the first menu function is arranged to be controlled by the deflection occurring in the auxiliary position of the control means.

* * * * *